United States Patent
Arnold et al.

(10) Patent No.: US 6,530,625 B2
(45) Date of Patent: Mar. 11, 2003

(54) ELECTRICALLY ACTUATED BRAKE WITH VIBRATION DAMPING

(75) Inventors: Jeffrey K. Arnold, South Bend, IN (US); Raymond J. Dale, Granger, IN (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/385,649

(22) Filed: Aug. 27, 1999

(65) Prior Publication Data

US 2003/0010583 A1 Jan. 16, 2003

(51) Int. Cl.[7] ............................................... B60T 8/86
(52) U.S. Cl. ..................... 303/126; 303/9.61; 303/6.01; 183/106 P
(58) Field of Search ............................ 188/161, 382, 188/181 R, 181 T, 106 P, 72.1, 73.2; 303/126, 9.61, 9.62, 176, 147, 122.09, 122.1, 6.01; 244/111

(56) References Cited

U.S. PATENT DOCUMENTS

| | | | |
|---|---|---|---|
| 3,630,578 A | * 12/1971 | Kaiser | 303/126 |
| 4,006,941 A | * 2/1977 | DeVlieg | 303/126 |
| 4,410,153 A | * 10/1983 | Romero | 303/126 |
| 4,430,715 A | * 2/1984 | Gentet et al. | 303/126 |
| 4,529,067 A | 7/1985 | Scott | 188/18 A |
| 4,596,316 A | 6/1986 | Crossman | 188/72.1 |
| 4,743,074 A | 5/1988 | Inoue | 303/100 |
| 4,865,162 A | 9/1989 | Morris et al. | 188/72.8 |
| 4,986,610 A | 1/1991 | Beck | 303/93 |

(List continued on next page.)

FOREIGN PATENT DOCUMENTS

| | | | |
|---|---|---|---|
| DE | 2262557 | 6/1974 | |
| DE | 19804676 | 8/1999 | |
| EP | 0 247 253 A | 12/1987 | B60T/8/00 |
| EP | 0 384 071 A | 8/1990 | B60T/8/00 |
| EP | 0443213 A2 | * 8/1991 | |
| EP | 0 936 373 A2 | 8/1999 | F16D/55/36 |
| JP | 01234628 | 9/1989 | |
| WO | 9207742 | 5/1992 | |

*Primary Examiner*—Jack Lavinder
*Assistant Examiner*—Mariano Sy
(74) *Attorney, Agent, or Firm*—Larry J. Palguta

(57) ABSTRACT

An electrically actuated braking system (30) of the type having a plurality of brake actuators (35, 37, 39, 41, 43, 45, 47, 49) disposed on a carrier housing (13) to selectively apply a braking force to effect the restraint of wheel rotation has the particular actuators employed during a braking event determined, at least in part, by monitored wheel motion. The system (30) reduces brake energy consumption and heat generation during slow speed operations, reduces braking induced vibration, and compensates for individual actuator failure. The system (30) includes a first circuit for energizing only a first proper subset of the plurality of the brake actuators (35, 37, 39, 41, 43, 45, 47, 49) upon occurrence of a braking command (59); a second circuit for energizing only a second proper subset of the plurality of brake actuators upon occurrence of a braking command; and wheel motion monitors (51, 53) providing control signals for selectively enabling the first circuit and not the second circuit in response to certain of the control signals, the second circuit and not the first circuit in response to other of the control signals, and both the first and second circuits in response to still other of the control signals. Typically, there are four disjoint proper subsets the union of which comprises all actuators for the given brake. Preferably the first and second circuits each energize exactly one brake actuator. In one form, the first and second circuits are both energized during normal braking while the first, but not the second, is energized during slow speed taxi or towing operation. In another form, the first subset comprises all properly operating brake actuators while the second comprises all malfunctioning brake actuators and the second circuit remains un-energized.

44 Claims, 3 Drawing Sheets

U.S. PATENT DOCUMENTS

| | | | |
|---|---|---|---|
| 4,995,483 A | 2/1991 | Moseley | 188/162 |
| 5,050,939 A | 9/1991 | Middelhoven | 303/71 |
| 5,172,960 A * | 12/1992 | Chareire | 303/9.61 |
| 5,178,235 A | 1/1993 | Montalvo | 188/18 A |
| 5,217,282 A | 6/1993 | Guichard | 303/9.73 |
| 5,255,761 A | 10/1993 | Zaremsky | 188/71.5 |
| 5,293,966 A | 3/1994 | Chareire | 188/72.1 |
| 5,348,122 A | 9/1994 | Brundrett | 188/71.5 |
| 5,456,523 A * | 10/1995 | Boehringer | 188/106 P |
| 5,645,143 A | 7/1997 | Mohr | 188/72.1 |
| 5,845,975 A | 12/1998 | Wells | 303/126 |
| 5,926,932 A | 7/1999 | Niespodziany | 29/401.1 |
| 5,971,111 A | 10/1999 | Maxwell | 188/72.5 |
| 6,000,516 A | 12/1999 | Teichert | 192/85 |
| 6,003,640 A * | 12/1999 | Ralea | 188/71.5 |
| 6,095,293 A | 8/2000 | Brundrett et al. | 188/72.1 |
| 6,196,359 B1 * | 3/2001 | Daudi | 188/72.5 |

* cited by examiner

ELECTRICALLY ACTUATED BRAKE WITH VIBRATION DAMPING

BRIEF SUMMARY OF THE INVENTION

The present invention relates generally to methods and apparatus for braking vehicles and more especially to such methods and apparatus for the selective control of electrically actuated aircraft braking systems.

An illustrative electrically actuated aircraft braking system is shown in U.S. Pat. No. 4,865,162 which teaches a plurality of annularly disposed electrically energizable torque motor and roller screw drive mechanisms for selectively engaging a pressure plate of a wheel and brake assembly and compressing a disc brake stack to retard aircraft motion. In such electrically actuated braking systems, all electromechanical actuators associated with a given wheel are actuated each time the brakes for that wheel are applied. This can result in undesirable heating of the brake assembly and sometimes unnecessary wear of the brake disks. Moreover, failure of one or more electromechanical actuators can result in uneven braking and a tendency for the aircraft to "pull" away from the side on which the failure has occurred due to a now lesser braking force on that side. Finally, most braking systems sometimes experience a "chatter" or undesirable vibration during a braking event.

The problem of disk wear is addressed in U.S. Pat. No. 4,923,056 where it is suggested to energize less than all of the brake assemblies during braking associated with slower speed taxi or towed situations where lesser braking force is required. While this patented system may alleviate the disk wear problem, all electromechanical actuators associated with a given wheel are actuated each time the brakes for that wheel are applied leaving the problems of undesirable heating of the brake assembly, vibration and uneven braking unresolved.

It is desirable to provide a braking system which reduces brake induced vibration, undesired unbalanced braking force, and unnecessary brake assembly heating all at a very modest increase in braking system cost.

The present invention provides solutions to the above problems by providing individual electromechanical actuator control within a brake system. Active vibration damping is a benefit of this system design and architecture, as are enhanced fault accommodation, improved thermal management and improved park and tow capabilities.

In accordance with one form of the invention, a braking system of the type having a plurality of individual actuators selectively energizable upon a braking command to frictionally restrain rotation of a vehicle wheel includes a control circuit operable in a normal braking mode to equally or unequally energize all of the plurality of actuators upon receipt of a braking command, and in a second mode to equally or unequally energize less than all of the plurality of actuators associated with a given wheel upon receipt of a braking command. The second mode may be a taxi mode where less than all actuators (a proper subset of all actuators for that brake) are enabled to diminish heat generation and energy consumption, a mode where the actuators are enabled in a routine to reduce brake vibration, or a failed actuator mode where a failed actuator and a matching actuator on the opposite side of the vehicle are disabled to maintain equal left-right retarding forces on the vehicle. An alternative failed actuator mode involves increasing the level of energization to the remaining actuators associated with the wheel of the failed actuator.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
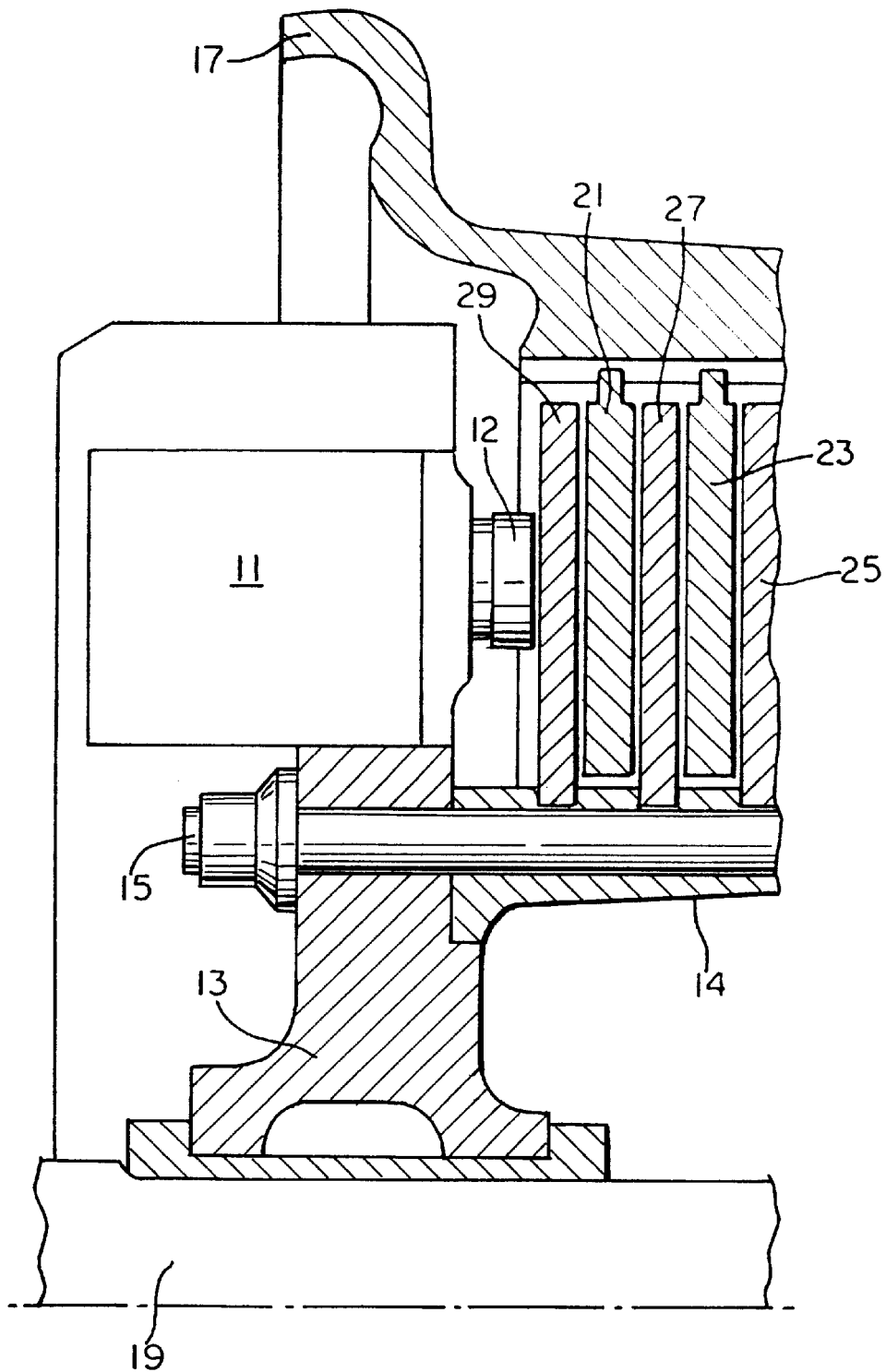
FIG. 1 is a cross-sectional view of a portion of a prior art vehicle wheel and brake assembly showing one electromechanical actuator.

In the wheel and brake assembly of FIG. 1, an illustrative electromechanical actuator 11 of brake carrier housing 13 is fixed to torque tube 14 by bolts 15. A wheel 17 is journalled for rotation about the axle 19. A brake disk stack has alternate rotor disks such as 21 and 23 fixed to and rotatable with the wheel 17 while intervening stator disks such as 25 and 27 are stationary and fixed to torque tube 14 connected with brake carrier housing 13. When actuator 11 (along with a plurality of similar annularly disposed actuators) is energized, piston 12 extends forcing the brake pressure plate disk 29 to compress the disk stack and slowing the vehicle as is conventional in multi-disk brake assemblies.

Figure 2:
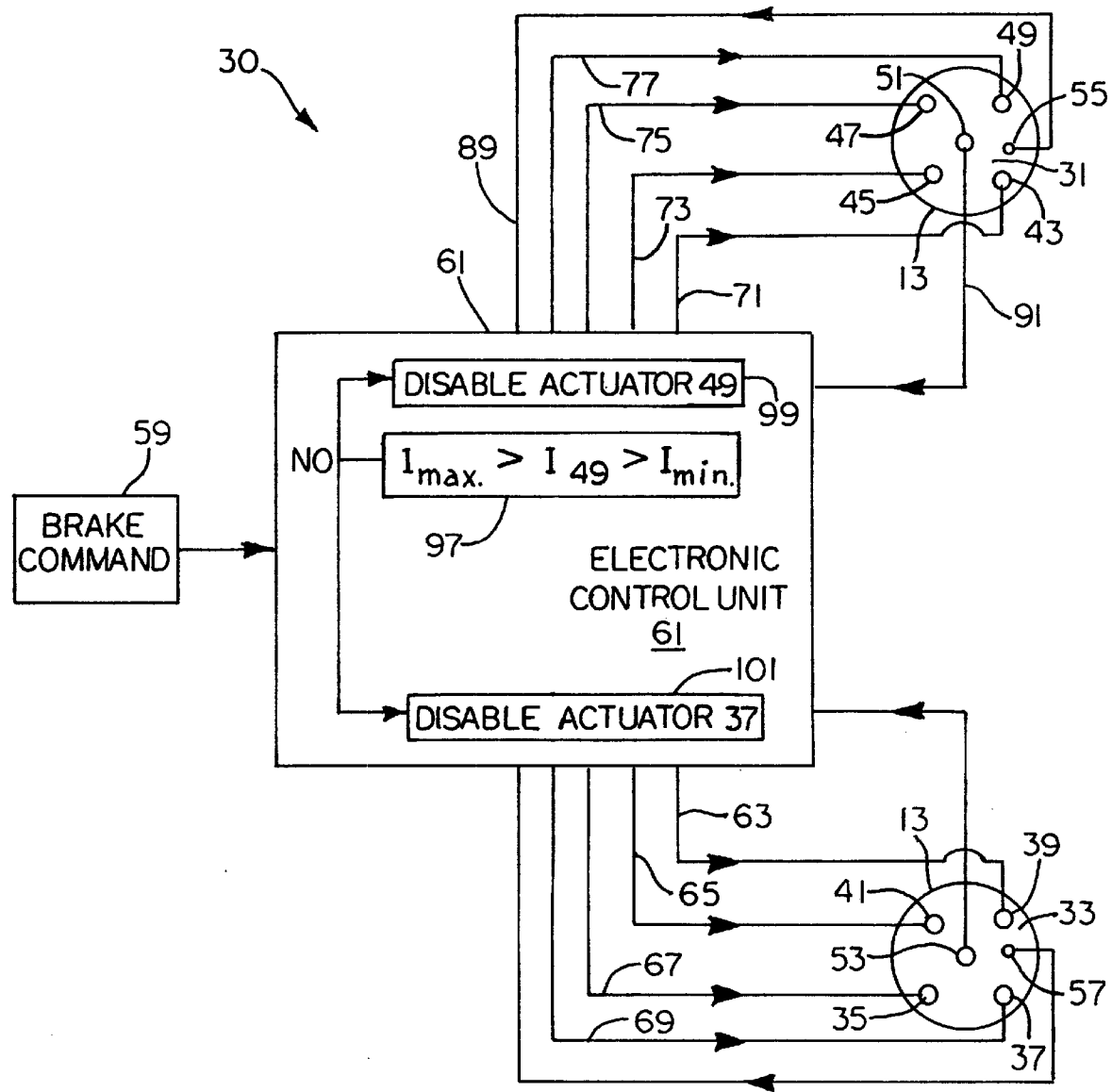
FIG. 2 is a schematic illustration of the electrically actuated brake system of the present invention showing illustrative left and right wheel brake assemblies with eight electromechanical brake actuators.

In FIG. 2, an electrically actuated braking system 30 comprises two wheel and brake assemblies 33 and 31 that are illustrated schematically with each having four electromechanical actuators ("EMAs") 35, 37, 39, 41, 43, 45, 47 and 49 mounted on the respective brake carrier housings 13 in an annular pattern about the axis of wheel rotation. EMAs may be obtained from companies such as MPC Products Corporation, Skokie, Ill. and AlliedSignal Aerospace, Torrance, Calif. The actuators or EMAs are selectively energizable upon occurrence of a braking command to apply a braking force to a pressure plate thereby compressing a brake disk stack and restraining wheel rotation. Each wheel and brake assembly 31, 33 also supports a wheel speed or torque sensor 51 and 53 as well as a vibration sensor 55 and 57. Except for the presence of the vibration sensors 55 and 57, the two wheel and brake assemblies 31 and 33 of FIG. 2 may, for example, be of the conventional type as described in FIG. 1.

When the pilot or other vehicle operator initiates a commanded braking event, the command, illustrated at 59, is supplied to an electronic control unit (ECU) 61 which normally supplies an enabling current to each electromechanical actuator ("EMA") by way of circuits 63, 65, 67, 69, 71, 73, 75 and 77. Proper operation of each actuator is monitored during a braking event. This may be accomplished by locating individual motion transducers at the EMA locations. It may also be achieved by monitoring actuator current flow as illustrated for one actuator 49 at 97. So long as the current is not excessive or too low, the actuator 49 remains enabled during braking. Should an indication that the current is not within limits occur, the actuator 49 is disabled as at 99. Most drivers have at one time or another experienced the sideways force or "pull" caused when one wheel is braked to a greater extent than another. Disabling actuator 49 could induce such a "pull." When the control unit 61 disables a single, failed EMA, to maintain balance between brakes, it may also disable a properly functioning EMA such as 37 on the other brake assembly as shown at 101. This would reduce the number of EMAs generating brake actuation force to 75% of the baseline which is consistent with a relatively crude brake control system. Disabling an actuator upon the occurrence of improper operation reduces the braking force on the associated wheel, and compensating by disabling another actuator of another wheel to reduce the braking force on the another wheel to substantially the same reduced level as the associated wheel restores the balance. For simplicity, only one actuator 49 is shown in FIG. 2 as being monitored and only the pair of actuators 37 and 49 shown with disabling circuits. It will be understood that the electronic control unit 61 would typically include current monitoring circuits and disconnect circuits for each EMA.

Figure 3:
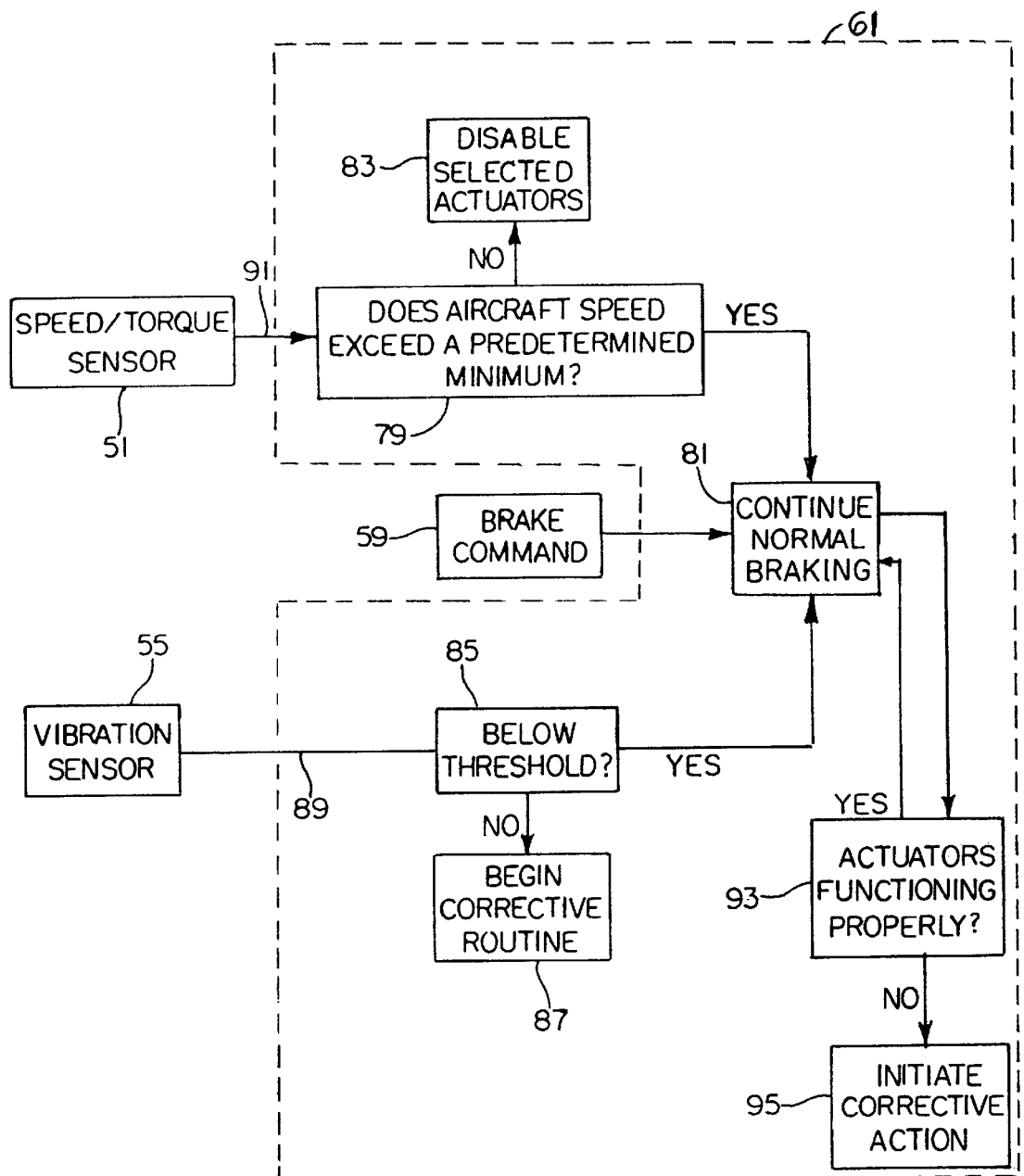
FIG. 3 is a schematic illustration of the operation of the electrically actuated brake system of FIG. 2.

Techniques for monitoring actuator behavior, such as by locating individual motion transducers at the actuator locations and corrective techniques are indicated generally at 93 and 95 in FIG. 3. The corrective action 95 for maintaining left and right braking balance may be achieved by inhibiting a failed EMA and compensating for any potential imbalance by driving the other three EMA's on the same wheel harder. The drive to the four EMA's on the other brake would be unchanged. With this system, the number of actuators is reduced and the level of actuator energization to at least some of the reduced number of actuators is increased thereby avoiding the tendency of another more forcefully braked wheel inducing a sideways force on the vehicle.

In FIG. 3, speed and vibration monitoring for a single brake are also illustrated. The speed or torque sensor 51 of brake 31 is coupled by circuit 91 to the electronic control unit 61. The vibration sensor 55 (which may, for example, be an accelerometer) of brake 31 is coupled to the electronic control unit 61 by circuit 89. Clearly, such monitoring may be duplicated for any other or all brakes as desired. The ability to remove power from individual EMA's and their associated power control electronics allows selective operation during periods where thermal management is a concern. One such condition is during long periods of aircraft taxi. The benefit of independent control is the ability to remove power (a significant source of heat during these conditions) from the EMA's and power control electronics in order to allow cooling. Under parking, and towing conditions, lower power consumption is achieved by enabling only the number of actuators required. If only one EMA is required to generate the desired level of brake application, there is no need to power two EMA's and additional power control electronics (as would be the case with paired EMA control). Since parking and towing operations are commonly associated with "no aircraft power" conditions (i.e. battery power, not engine generated), there is an advantage to this "only as required" operation. When the vehicle operator issues a braking command at 59, normal braking commences as indicated at 81. The control unit 61 may monitor the aircraft speed as indicated at 79 and operate all the brake actuators in one mode (normal braking 81) during landing and roll-out of the aircraft so long as the speed exceeds a predetermined value and switch to a second mode 83 where certain actuators are disabled or the actuator drive reduced during taxi and towing of the aircraft when the speed drops below that predetermined minimum. Speed or torque sensor 51 may also participate in a conventional anti-lock braking function.

The availability of independent actuator control offers other advantages. The force generated by each EMA can be tailored to a given situation. Normally, the EMA's would be driven to apply equal forces to the pressure plate 29. In other situations, such as adverse vibration conditions, they could be driven to apply unequal forces with the distribution tailored to the situation, such as providing damping. This active vibration damping may be accomplished by mounting one, or more, accelerometer(s) 55 in the brake or carrier housing. This vibration sensing means 55 associated with the brake 31 is coupled to the vibration threshold sensing circuit 85 in control unit 61. The control unit operates the brakes in a normal mode 81 so long as the vibration sensed by the sensing means 55 remains below a specified level and changes to a vibration damping mode or corrective routine 87 when the sensed vibration exceeds the specified level. The vibration sensor signals may undergo more sophisticated analysis and the corrective routine be based on that analysis. The corrective routine may be a program of variations in the energization of individual ones of the actuators in accordance with a stored sequence during the braking event to vary the braking force applied to the wheel to avoid excitation of adverse vibration of the brake thereby preventing the build-up of brake vibration induced by the braking force. For example, as the ECU 61 receives and processes the accelerometer signal, it may be programmed to respond to a specific vibration spectrum with a corresponding EMA force distribution spectrum. Thus, in response to a given vibration condition, the active damping mode of force distribution would be initiated by the ECU. It would continue to work through the active damping mode until the vibration conditions met specific criteria for a normal mode. Another approach would be to have the ECU examine the EMA feedback signals for "indications" of adverse vibration conditions and to respond accordingly. For example, the ECU could "look" for backdriving of the EMAs by the brake stack (at a high level, this could be an indication of whirl) and alter the command signals to compensate. In this case, there would be no need for accelerometers but "feedback loops" would be utilized (the feedback in this example is coming from the EMAs). In another, even simpler approach, the ECU could be programmed to apply the EMA's in a pattern that would avoid exciting adverse vibration conditions. This selective application could be derived empirically (by test), validated and then programmed. In this approach, there would not be any need for accelerometers or feedback loops.

It will be understood that, while only two wheel and brake assemblies have been illustrated in FIG. 2, additional wheel and brake assemblies may be connected in parallel with those illustrated to receive like selective energization, or additional wheel and brake assemblies with their own dedicated control circuits may be added allowing independent control of the additional individual actuators. While the invention has been described in conjunction with electromechanical actuators, hydraulic or other actuator schemes may advantageously employ this invention.

In summary, the invention has a number of advantages over known prior braking systems. The system architecture is structured to allow each EMA to act independently under the control of the ECU 61. Any given actuator may be operated at a different force level, and be at a different piston displacement, velocity, or acceleration from the other EMA's in the brake system. This independent EMA control has several potential benefits including enhanced fault accommodation, improved thermal management capability particularly during park or tow operation, and the capacity for vibration damping. There is the additional benefit of improved tolerance to friction material damping characteristics. Specifically, an ability to compensate for, or to avoid, adverse vibration modes allows friction materials to be designed and manufactured with less emphasis on vibration performance characteristics. This may have cost benefit implications for friction material design and manufacture.

What is claimed is:

1. A braking system having a plurality of individual brake actuators associated with a respective brake and the individual brake actuators of the respective brake selectively and individually energizable including each individual brake actuator operable independently at any commanded energization level between the range of no energization and full energization during a brake command to effect the frictional restraint of rotation of an associated vehicle wheel, comprising means for controlling the actuators and operable in a first mode to equally or unequally energize all of the plurality of actuators associated with the brake upon receipt of a braking command, and operable in a second mode to equally or unequally energize less than all of the plurality of actuators associated with the brake upon receipt of a braking command, such that all of the plurality of individual brake actuators associated with the respective brake are energized to effect braking in the first mode and less than all of the plurality of individual brake actuators associated with the respective brake are energized to effect braking in the second mode.

2. The improvement of claim 1, wherein in the second mode and upon receipt of a braking command, certain ones of the actuators receive equal energization while other of the actuators receive'some energization but less than said certain ones of the actuators.

3. The improvement of claim 1, wherein in the second mode and upon receipt of a braking command, certain of the actuators receive equal energization while other of the actuators remain un-energized.

4. The improvement of claim 1, wherein the selectively and individually energizable brake actuators are electrically actuated electromechanical actuators.

5. The improvement of claim 1, wherein the vehicle wheel comprises one of several wheels of an aircraft, the control means operating in the first mode during landing and roll-out of the aircraft and in the second mode during taxi and towing of the aircraft.

6. The improvement of claim 1, further comprising vibration sensing means associated with the brake and connected with the control means, the control means operating in the first mode so long as vibration sensed by the sensing means remains below a specified level and in the second mode when the sensed vibration exceeds the specified level.

7. The improvement of claim 1, wherein the vehicle wheel comprises one of several wheels of an aircraft, each wheel having an associated brake with each brake having a respective set of selectively and individually energizable brake actuators.

8. The improvement of claim 7, wherein each brake comprises a multi-disk brake.

9. An electrically actuated braking system having a brake disk stack selectively compressed to restrain wheel rotation; a plurality of individually operable brake actuators disposed at a carrier housing in an annular pattern about the axis of wheel rotation and selectively and individually energizable including each individual brake actuator operable independently at any commanded energization level between the range of no energization and full energization during occurrence of a braking command to apply a braking force to thereby compress the stack and restrain wheel rotation; a first circuit for energizing only a first proper subset of the plurality of the brake actuators upon occurrence of a braking command; a second circuit for energizing only a second proper subset of the plurality of brake actuators upon occurrence of a braking command; means for monitoring wheel motion and providing a plurality of distinguishable control signals indicative of different monitored wheel motion conditions; and circuitry for selectively enabling the first circuit and not the second circuit in response to certain of the control signals, the second circuit and not the first circuit in response to other of the control signals, and both the first and second circuits in response to still other of the control signals.

10. The electrically actuated braking system of claim 9, wherein the first and second proper subsets are disjoint.

11. The electrically actuated braking system of claim 9, wherein the first and second circuits each energize one brake actuator.

12. The electrically actuated braking system of claim 11, further comprising additional circuits, one for each additional brake actuator, whereby enabling of each individual one of the brake actuators is determined by the control signals.

13. The electrically actuated braking system of claim 9, wherein a union of the first and second proper subsets comprises the entire plurality of brake actuators.

14. The electrically actuated braking system of claim 9, wherein the means for monitoring wheel motion includes means for selecting subsets and responsive to the control signals to select the subsets whereby particular actuators employed during a braking event are determined, at least in part, by monitored wheel motion.

15. The electrically actuated braking system of claim 14, wherein the selecting means is active during an entire braking event whereby the selection of the particular actuators employed during a braking event may be modified during the braking event as determined by the monitored wheel motion.

16. The electrically actuated braking system of claim 9, wherein the plurality of brake actuators are electromechanical actuators.

17. The electrically actuated braking system of claim 9, wherein an associated wheel comprises one of several wheels of an aircraft, each wheel having an associated brake with each brake having a respective set of selectively and individually energizable brake actuators.

18. The electrically actuated braking system of claim 17, wherein each brake comprises a multi-disk brake.

19. A braking system having a plurality of individual brake actuators associated with a respective brake and the individual brake actuators of the respective brake selectively and individually energizable including each individual brake actuator operable independently at any commanded energization level between the range of no energization and full energization during a commanded braking event to effect the frictional restraint of rotation of an associated vehicle wheel, a method of reducing brake vibration comprising:

monitoring brake vibration during a braking event; and modifying, in accordance with the monitored vibration, the energization of one or more individual actuators during the braking event to modify the braking force applied to the wheel and reduce the vibration of the brake.

20. The braking system of claim 19, wherein the system is responsive to back driving of the actuators by the brake, in order to modify appropriately the energization of the actuators.

21. The braking system of claim 19, wherein the selectively and individually energizable brake actuators are electrically actuated electromechanical actuators.

22. The braking system of claim 21, wherein the vehicle wheel comprises one of several wheels of an aircraft, each wheel having an associated brake with each brake having a respective set of selectively and individually energizable brake actuators.

23. The braking system of claim 22, wherein each brake comprises a multi-disk brake.

24. A braking system having a plurality of individual brake actuators associated with a respective brake and the individual brake actuators of the respective brake selectively and individually energizable including each individual brake actuator operable independently at any commanded energization level between the range of no energization and full energization during a commanded braking event to effect the frictional restraint of rotation of an associated vehicle wheel, a method of reducing heat generated by actuator energization during relatively slow speed ground operations comprising:

monitoring vehicle speed; and reducing the energization of the energized brake actuators based on the monitored vehicle speed.

25. The braking system of claim 24, wherein the selectively and individually energizable brake actuators are electrically actuated electromechanical actuators.

26. The braking system of claim 25, wherein the vehicle wheel comprises one of several wheels of an aircraft, each wheel having an associated brake with each brake having a respective set of selectively and individually energizable brake actuators.

27. The braking system of claim 26, wherein each brake comprises a multi-disk brake.

28. A braking system having a plurality of individual brake actuators associated with a respective brake and the individual brake actuators of the respective brake selectively and individually energizable including each individual brake actuator operable independently at any commanded energization level between the range of no energization and full energization during a commanded braking event to effect the frictional restraint of rotation of an associated vehicle wheel, a method of reducing the heat generated by actuator energization during relatively show speed ground operations comprising:

monitoring vehicle speed; and disabling certain ones of the individual actuators when the monitored vehicle speed is below a specified threshold.

29. The braking system of claim 28, wherein the selectively and individually energizable brake actuators are electrically actuated electromechanical actuators.

30. The braking system of claim 29, wherein the vehicle wheel comprises one of several wheels of an aircraft, each wheel having an associated brake with each brake having a respective set of selectively and individually energizable brake actuators.

31. The braking system of claim 30, wherein each brake comprises a multi-disk brake.

32. A multi-wheel vehicle braking system wherein each wheel has a plurality of individual brake actuators associated with a respective brake and the individual brake actuators of the respective brake selectively and individually energizable including each individual brake actuator operable independently at any commanded energization level between the range of no energization and full energization during a commanded braking event to effect the frictional restraint of rotation of an associated vehicle wheel, a method of maintaining substantially the same braking force on each wheel during the braking event comprising:

energizing less than all of the actuators of a respective brake which are energized during a braking event; and increasing the level of actuator energization to at least some of the energized actuators thereby avoiding the tendency of another more forcefully braked wheel inducing a sideways force on the vehicle.

33. The braking system of claim 32, wherein the same increased level of actuator energization is applied to all of the energized actuators.

34. The braking system of claim 32 wherein the selectively and individually energizable brake actuators are electrically actuated electromechanical actuators.

35. The braking system of claim 34, wherein the vehicle wheel comprises one of several wheels of an aircraft, each wheel having an associated brake with each brake having a respective set of selectively and individually energizable brake actuators.

36. The braking system of claim 35, wherein each brake comprises a multi-disk brake.

37. An electrically actuated braking system having an electronic control unit and a plurality of individual brake actuators associated with a respective brake and the individual brake actuators of the respective brake selectively and individually energizable including each individual brake actuator operable independently at any commanded energization level between the range of no energization and full energization during a commanded braking event to effect the frictional restraint of rotation of an associated vehicle wheel, a method of avoiding braking induced wheel vibration comprising:

predetermining a sequence of energization levels for individual ones of the actuators of a brake to minimize the introduction of braking vibrations during a braking event;

storing the predetermined sequence in the electronic control unit; and varying the energization of one or more individual actuators of the brake in accordance with the stored sequence during the braking event to vary the braking force applied to the associated vehicle wheel to avoid excitation of adverse vibration of the brake thereby preventing the build-up of brake vibration induced by the braking force.

38. The braking system of claim 37, wherein the selectively and individually energizable brake actuators are electrically actuated electromechanical actuators.

39. The braking system of claim 38, wherein the vehicle wheel comprises one of several wheels of an aircraft, each wheel having an associated brake with each brake having a respective set of selectively and individually energizable brake actuators.

40. The braking system of claim 39, wherein each brake comprises a multi-disk brake.

41. A multi-wheel vehicle braking system where each associated brake and vehicle wheel have a plurality of individual brake actuators selectively and individually energizable including each individual brake actuator operable independently at any commanded energization level between the range of no energization and full energization during a commanded braking event to effect the frictional restraint of rotation of the associated vehicle wheel, a method of maintaining substantially the same braking force on each wheel during the braking event comprising:

monitoring each actuator for failure during a braking event;

disabling an actuator upon the occurrence of failure thereby reducing the braking force on an associated vehicle wheel; and disabling another actuator of another wheel to reduce the braking force on the another wheel to substantially the same reduced braking force as the associated vehicle wheel.

42. The braking system of claim 41, wherein the selectively and individually energizable brake actuators are electrically actuated electromechanical actuators.

43. The braking system of claim 42, wherein the vehicle wheel comprises one of several wheels of an aircraft, each wheel having an associated brake with each brake having a respective set of selectively and individually energizable brake actuators.

44. The braking system of claim 43, wherein each brake comprises a multi-disk brake.

* * * * *